United States Patent [19]

Adar et al.

[11] Patent Number: 5,278,812
[45] Date of Patent: Jan. 11, 1994

[54] TRACKING AND FOCUSSING FUNCTIONS IN OPTICAL DISK APPARATUS

[75] Inventors: Renen Adar, Westfield; Rudolf F. Kazarinov, Martinsville, both of N.J.

[73] Assignee: AT&T Bell Laboratories, Murray Hill, N.J.

[21] Appl. No.: 837,510

[22] Filed: Feb. 18, 1992

[51] Int. Cl.$^5$ .............................................. G11B 7/095
[52] U.S. Cl. ........................ 369/44.120; 369/44.230; 369/44.370; 369/112; 369/121; 385/132
[58] Field of Search ...... 369/44.11, 44.12, 44.14, 44.23, 44.26, 44.37, 44.38, 54, 112, 120-122, 385/1, 9, 14-15, 28, 31-33, 39, 45, 49, 130, 132

[56] References Cited

U.S. PATENT DOCUMENTS

| | | | |
|---|---|---|---|
| 4,478,483 | 10/1984 | Sprague | 369/44.12 X |
| 4,991,160 | 2/1991 | Premji | 369/44.12 |
| 4,998,793 | 3/1991 | Henry et al. | 385/1 |
| 5,070,488 | 12/1991 | Fukushima et al. | 369/44.12 |
| 5,195,152 | 3/1993 | Gupta | 369/44.12 X |

FOREIGN PATENT DOCUMENTS 0345232 12/1989 European Pat. Off. .
0452063 10/1991 European Pat. Off. .

OTHER PUBLICATIONS

Patent Abstracts of Japan, vol. 9, No. 190, (P-378), Aug. 7, 1985, and p. 60-059547.
SPIE vol. 935 Gradient-Index Optics and Miniature Optics (1988) Glenn T. Sincerbox, "Miniature Optics for Optical Recording" pp. 63-75.
Katagiri et al., "A Monolithic Three-Channel LD-PD Array with Vertically Staggered facets for Autofocusing Reflectivity Sensors", *IEEE Photonics Technology Letters,* May 4, 1992, No. 5, pp. 476-479.

*Primary Examiner*—W. R. Young
*Attorney, Agent, or Firm*—Michael J. Urbano

[57] ABSTRACT

In optical apparatus for reading, writing or erasing optical disks, the optical head is implemented in integrated form. Silicon optical bench technology, including integrated optical waveguides, Y-splitters and directional couplers, is used in the design of the tracking, lens focussing, and read/write/erase functions.

14 Claims, 4 Drawing Sheets

TRACKING AND FOCUSSING FUNCTIONS IN OPTICAL DISK APPARATUS

BACKGROUND OF THE INVENTION

This invention relates to apparatus for reading, writing or erasing information from and to optical disks. In particular, the invention relates to read-only disks (e.g., CD-ROMs), write-once-read-many (WORM) disks, and erasable magneto-optic disks, for example.

The optical subsystem design required to write, read and erase information in an optical recording system has evolved over time to follow the developments in recording media technology and changes in applications. Early designs were configured around gas lasers rather than semiconductor (diode) lasers mainly due to the lack of adequate power and reliability of early diode lasers. Driven by the mass consumer market for CD players, the situation has changed. Cheap, high power diode lasers are now available in large quantities. With the availability of these diode lasers and the development of write-once and erasable media for an emerging mass market for optical storage, the thrust for optical recording research and development has now shifted toward the design of more compact drives giving a higher level of performance at a lower price to satisfy the needs for a true mass market. A prime concern in this development process is the miniaturization of the optical subsystem, or head, required for all optical storage applications. This trend is expected to continue as the range of applications for optical storage broadens and attempts are made to compete directly with alternative magnetic recording technologies.

The current, state-of-the-art optical head technology uses free-space optics based on assembling precisely aligned bulk optic components. The two major problems with this conventional approach are the cost and weight of the bulk optical assembly. The large mass of a typical conventional magneto-optic head (about 100 g) results in relatively long access times (e.g., 90 msec for magneto-optic heads vs. 15 msec for non-optical, hard disk magnetic heads). In the most advanced recent designs of optical heads only a part of the optical subsystem moves. This design has reduced the moving mass of the head to 6 g and the access time to 20 msec. However, decreased access time was achieved at the cost of a significant increase in complexity of the mechanics and optics of the disk drive, with concomitant higher cost.

Thus, a need remains in the art for a low mass, fast access time optical head which can be fabricated at relatively low cost.

SUMMARY OF THE INVENTION

The need remaining in the art is addressed by the invention, optical disk apparatus which is implemented using an integrated optical waveguide structure to reduce the bulk and mass of the optical head. The apparatus comprises means for rotating an optical disk, which has information sites associated with tracks on the disk, an optical head for directing light beams to preselected sites and for receiving light beams reflected from those sites. The head comprises means for focussing a plurality of light beams onto the disk, and means for detecting a plurality of light beams reflected from the disk. The apparatus also includes feedback means responsive to the reflected light beams for performing tracking and/or focussing functions, and further includes data means for determining which information sites on the disk are read, written or erased.

To perform the tracking function, one embodiment of the waveguide structure includes a waveguide illuminator/receptor coupled to a mode interference section. The waveguide illuminator/receptor directs a fundamental mode beam through the lens which focusses the beam onto a selected track (or groove). If the apparatus is tracking properly, the beam is symmetrically positioned on the track (or groove), and essentially only the fundamental mode is reflected from the disk back into the waveguide illuminator/receptor. On the other hand, if the apparatus is not tracking properly, the beam is asymmetrically positioned on the track (or groove), and both the fundamental and first order modes are reflected from the disk back into the waveguide illuminator/receptor. These modes interfere in the interference section so as to generate an error signal representing the degree of mistracking. An important aspect of this embodiment is that the degree of mistracking is a linear function of the displacement of the beam from its symmetrical position on the track (or groove).

To perform the lens focussing function, another embodiment of the waveguide structure includes a plurality of spaced apart waveguide illuminator/receptors which direct a plurality of spaced apart light beams through the lens onto different focussed spots on the disk. The spots are located in different spatial planes. Thus, a first (data) beam to perform read, write or erase functions is focussed properly on a plane of the disk, a second beam is focussed slightly above the plane, and a third beam is focussed slightly below the plane. As the disk rotates, if the distance between the disk and the waveguide structure equals a preselected reference distance, then the second and third beams are reflected back into their corresponding second and third waveguide illuminator/receptors with essentially equal power. No error signal is created, and the first beam is properly focussed on the disk. However, if the disk-to-waveguide structure distance varies (e.g., the disk "waffles") from the preselected distance, then the amount of light reflected from the disk back into the second and third waveguides illuminator/receptors is unequal. Under this condition, the data beam will not be properly focussed onto the disk, and an error signal may be generated to reposition the lens relative to the disk and bring the data beam into focus.

The tracking and focussing embodiments are preferably utilized in combination with one another. However, it is also contemplated that either can be used in combination with other designs to perform these functions.

In addition, for other applications, such as those involving magneto-optic heads which are polarization sensitive, the waveguide structure may also include a polarization splitter capable of separating TE and TM polarizations.

BRIEF DESCRIPTION OF THE DRAWINGS

The invention, together with its various features and advantages, can be readily understood from the following more detailed description taken in conjunction with accompanying drawing, in which.

DETAILED DESCRIPTION

General Structure

Figure 1:
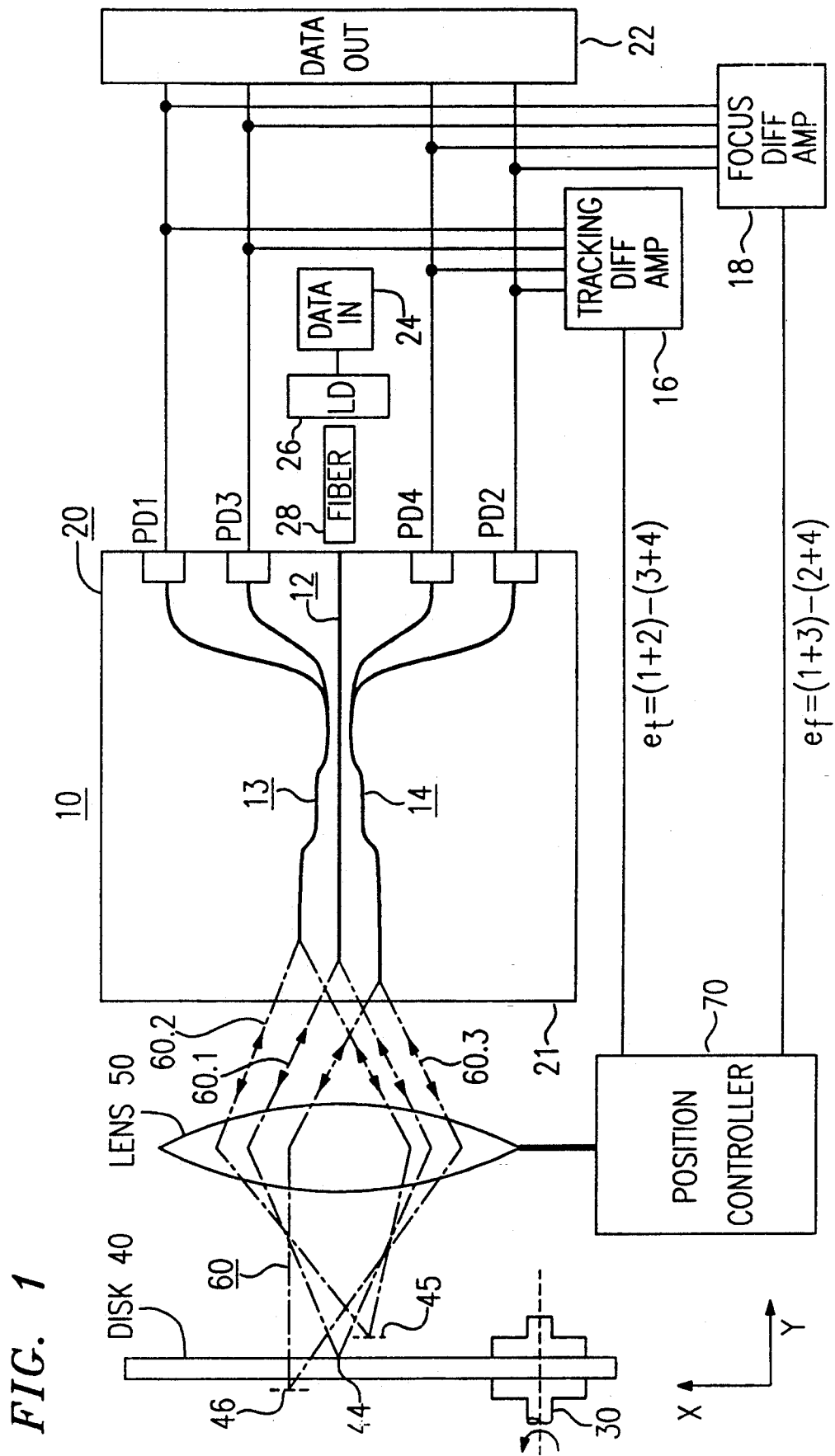
FIG. 1 is a schematic plan view of optical disk apparatus in accordance with one embodiment of the invention.

Turning now to FIG. 1, there is shown optical disk apparatus 10 which is implemented using an integrated optical waveguide structure 20 to reduce the bulk and mass of the optical head. The apparatus comprises means 30 for rotating an optical disk 40, means including a lens 50 for focussing a plurality of light beams 60 onto the disk 40, and means (e.g., photodetectors PD1-PD4) for detecting a plurality of light beams reflected from the disk. The apparatus also includes feedback means (e.g., differential amplifiers 16, 18 and position controller 70) responsive to the reflected light beams for performing tracking and/or lens focussing functions. Data output circuit 22 represents a receiver of data read from the disk. On the other hand, data input circuit 24 drives laser diode (LD) 26 and represents a source of data to be inputed onto disk 40 (e.g., to perform either the write or erase function, if appropriate). Laser diode 26 is optically coupled to waveguide structure 20 via, for example, an optical fiber 28 interposed between waveguide 12 and laser diode 26. Alternatively, fiber 28 could be omitted in which case LD 26 could be mounted on structure 20 and directly coupled to waveguide 12. In either case, it may be desirable in some applications (e.g., computer memory) to optically isolate LD 26 from light beams reflected from the disk.

Figure 3:
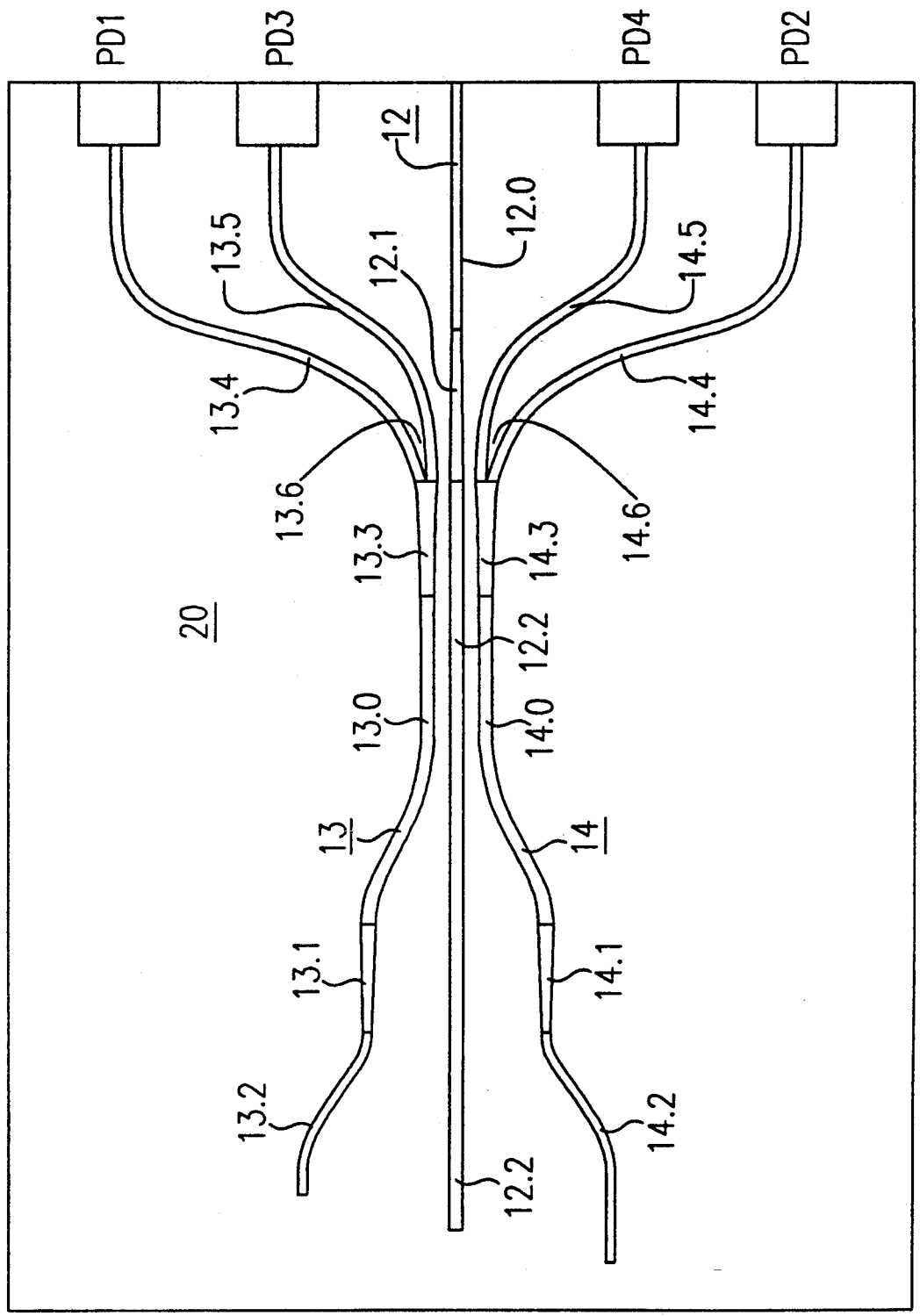
FIG. 3 is an enlarged plan view of the waveguide structure of FIG. 1.

As shown in FIG. 3, the waveguide structure 20 includes waveguides 12, 13 and 14, with waveguide 12 being a central waveguide coupled to fiber 28 and waveguides 13 and 14 being lateral waveguides coupled to photodetectors PD1, PD3 and PD2, PD4, respectively. Each lateral waveguide 13, 14 is coupled to central waveguide 12 via a directional coupler 13.0, 14.0. In addition, each lateral waveguide 13, 14 includes a Y-branch 13.6, 14.6 which splits the waveguide into a pair of adjacent single mode waveguides 13.4, 13.5 and 14.4, 14.5 coupled to photodetectors PD1, PD3 and PD2, PD4, respectively. Each pair of adjacent waveguides forms an interference section wherein modes constructively interfere in one waveguide (e.g., 13.4) and destructively interfere in the adjacent waveguide (e.g., 13.5).

Various tapered sections may be used to make the transitions between other sections adiabatic (gradual) and hence to reduce the likelihood of mode conversion. Adiabatic transitions are described by C. H. Henry et al in U.S. Pat. No. 4,998,793. Thus, for example, each lateral waveguide 13, 14 includes a tapered section 13.1, 14.1 between single mode waveguide section 13.2, 14.2 and directional coupler 13.0, 14.0. Likewise a tapered section 13.3, 14.3 is interposed between the latter coupler and Y-branch 13.6, 14.6. Finally, a tapered section 12.1 is positioned in central waveguide 12 between single mode section 12.0 and multimode section 12.2 and is located adjacent Y-branches 13.6, 14.6.

The waveguide sections 12.2, 13.2 and 14.2 serve as illuminator/receptors of light incident on or reflected from optical disk 40.

Note that FIG. 3 includes short, vertical lines between various waveguide sections for purposes of clarity only. These lines do not represent physical interfaces.

The electrical outputs of the photodetectors are compared in differential amplifier 18 to generate an error signal $e_f$ indicating the degree to which the apparatus is out of focus; i.e., the degree to which light beam 60.1 is not properly focussed on disk 40. The error signal directs position controller to move lens 50 in the y-direction until proper focus is achieved.

The electrical outputs of the photodetectors are likewise compared in differential amplifier 16 to generate an error signal $e_t$ indicating the degree to which the apparatus is not tracking; i.e., the degree to which the light beam 60.1 is not symmetrically positioned on a selected track of disk 40. The error signal directs position controller to move lens 50 in the x-direction until proper tracking is achieved. Importantly, $e_t$ is a linear function of the degree of mistracking.

The tracking and lens focussing functions are described in greater detail below.

Tracking Function

To perform the tracking function as shown in FIG. 1, laser diode 26 generates a fundamental mode beam which is coupled through optical fiber 28 into waveguide structure 20; i.e., into single mode waveguide section 12.0, and hence into illuminator/receptor waveguide section 12.2 which supports both the fundamental and first order modes. The beam 60.1 which emanates from the end of waveguide 12.2 is focussed by lens 50 onto a selected track (e.g., 41, FIG. 2) of rotating disk 40. If the apparatus is tracking properly, the beam 60.1 is symmetrically positioned on track 41, and essentially only the fundamental mode is reflected from the disk back into the waveguide 12.2. On the other hand, if the apparatus is not tracking properly, the beam 60.1 is asymmetrically positioned on the track 41, and as a consequence both the fundamental and first order modes are reflected from the disk back into the waveguide 12.2. These modes are coupled from waveguide section 12.2 through directional couplers 13.0, 14.0 into lateral waveguides 13, 14; i.e., into Y-branches 13.6, 14.6 where the modes interfere so as to generate an error signal $e_t$ representing the degree of mistracking.

Figure 2:
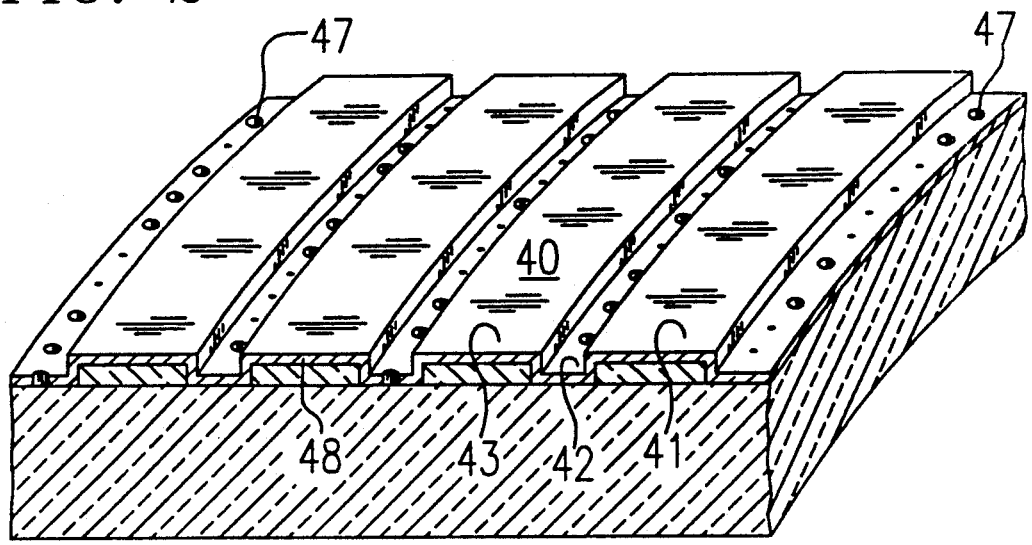
FIG. 2 is a schematic cross-section of an illustrative optical disk.

More specifically, the light beam from laser diode 26 enters single mode waveguide section 12.0 and propagates through both the tapered section 12.1 and the waveguide illuminator/receptor section 12.2. Although waveguide section 12.2 is designed to support two modes, the outgoing light beam propagates as the fundamental mode because the transition through tapered section 12.1 is adiabatic. The field distribution of the end of the waveguide section 12.2 is imaged onto the disk surface by the lens 50. The reflected field is imaged back onto the end of waveguide section 12.2. The disk surface is typically corrugated as shown in FIG. 2, and the different rays forming the reflected image propagate different roundtrip distances; i.e., a ray reflected from the groove 42 between tracks 41 and 43 travels a longer distance than a ray reflected from track 41 itself. Preferably the difference in roundtrip distances is made to be $\lambda/4$ by making the step height of the tracks $\lambda/8$, where $\lambda$ is the free-space wavelength of the light from LD 26. As a result, the phase of the reflected image is no longer a constant, rather it depends on position in the x-direction. In other words, the reflected light can excite in the waveguide section 12.2 both fundamental and first order modes. When the beam is symmetrically positioned on a track of the disk, only the fundamental mode is reflected back onto waveguide section 12.2. However, when it is asymmetrically positioned, a phase distortion causes the first order mode to also be excited. Typically, however, the power of the first order mode reflected back is less than that of the fundamental.

These modes are coupled into lateral waveguides 13, 14 via directional couplers 13.0, 14.0 and hence into Y-branches 13.6, 14.6. They interfere constructively in one branch of each waveguide pair (e.g., in sections 13.4, 14.4) and destructively in the other branch (e.g., in sections 13.5, 14.5), depending on the direction of the x-displacement of the beam from the center of the track 41. To ensure proper mode interference, the length of waveguide section 12.2 should be designed, by calculations well known in the art, such that the difference in phase between the modes is not $\pi/2$ and is preferably 0 or $n\pi$, where n is an integer, at the vertex of the Y-branches. The optical power in waveguide sections 13.4, 13.5 and 14.4, 14.5 is detected by photodetectors PD1, PD3 and PD2, PD4, respectively. Various combinations of photocurrent outputs may be compared in differential amplifier 16 to generate an error signal $e_t$ to correct the x-position of the lens 50 (or lens 50 and structure 20 together) via controller 70 so as to reposition the light beam to the center of the track. In particular, using only the outputs of waveguides 13.4 and 13.5, $e_t = (1-3)$; or using only the outputs of waveguides 14.4 and 14.5, $e_t = (2-4)$; or using all four waveguides, $e_t = (1+2)-(3+4)$, where the integers 1 to 4 represent the photocurrents of the corresponding photodetectors PD1 to PD4. The latter choice for $e_t$ yields a larger error signal and may be preferred in some applications.

As noted earlier, an important characteristic of this embodiment of the invention is that the error signal is linearly related to the degree of mistracking; i.e., linearly related to the electric field $E_1$ of the first order mode. To appreciate this fact, consider that the output intensity $I_1$ from a waveguide section where the fundamental mode (field $E_0$ at the vertex of Y-branch) and first order mode (field $E_1$ at the vertex) constructively interfere (e.g., in section 13.4) is given by $$I_1 = (E_0+E_1)^2 = E_0^2 + 2E_0E_1 + E_1^2.$$

In contrast, in the waveguide section where the modes destructively interfere (e.g., in section 13.5) the intensity $I_3$ of the output is given by $$I_3 = (E_0-E_1)^2 = E_0^2 - 2E_0E_1 + E_1^2.$$

When the difference $(I_1 - I_3)$ is generated by comparing the outputs of photodetectors PD1 and PD3 in differential amplifier 16, the result is that $e_t$ is proportional to $4E_0E_1$; hence $e_t$ is linearly related to $E_1$ and hence to the degree of mistracking.

Although the foregoing description assumes that the tracking function is performed by focussing the beam onto a preselected track, it could equivalently be focussed onto a groove between tracks without departing from the spirit of the invention.

Focussing Function

As shown in FIGS. 1 and 3, to perform the lens focussing function, the waveguide structure 20 includes a plurality of waveguide illuminator/receptors 12.2, 13.2 and 14.2 which direct a plurality of spaced apart light beams 60.1, 60.2 and 60.3, respectively, onto different spots on the disk 40. A first (data) beam 60.1 to perform read, write or erase functions is focussed properly on a plane 44 of the disk (e.g., on the top surface of metal film 48, FIG. 2), a second beam 60.2 is focussed on plane 45 which is slightly (e.g., 10 $\mu$m) above plane 44, and a third beam 60.3 is focussed on plane 46 which is slightly (e.g., 10 $\mu$m) below plane 44. As the disk 40 rotates, if the distance between the disk and the waveguide structure 20 is equal to a predetermined reference distance, then the second and third beams 60.2 and 60.3 are reflected and coupled back into their corresponding waveguide illuminator/receptors 13.2 and 14.2, respectively, with essentially equal power. The reflected beams propagate through lateral waveguides 13 and 14 respectively, to photodiodes PD1, PD3 and PD2, PD4. The photocurrent outputs are compared in differential amplifier 18 to generate error signal $e_f$. No error signal is generated if the first beam 60.1 is properly focussed on the disk.

However, if the disk-to-waveguide structure distance varies (e.g., the disk "waffles"), then the amount of light reflected from the disk back into the waveguide illuminator/receptors 13.2 and 14.2 is unequal. Under this condition, the data beam 60.1 is not properly focussed onto the disk, and an error signal $e_f$ is generated by differential amplifier 18 to reposition lens 50 in the y-direction via controller 70 to bring the data beam into focus.

Various combinations of the photocurrents may be compared to generate $e_f$. Using only output waveguide sections 13.4 and 14.4, $e_f = (1-2)$; using only sections 13.5 and 14.5, $e_f = (3-4)$; but using all four sections, $e_f = (1+3)-(2+4)$, where the integers 1 to 4 correspond to the respective photodetectors PD1 to PD4. The latter case may be preferred for many applications because $e_f$ would be independent of tracking.

More specifically, the beams propagating in waveguide illuminator/receptors 12.2, 13.2 and 14.2 are emitted into free space at the ends of the waveguides which are terminated at different optical distances from the disk 40 or, equivalently in this case, from the edge 21 of structure 20. Given that all three beams propagate in the same media, the physical distance is equal to the optical distance. Illustratively, therefore, central waveguide 12.2 terminates at a physical distance d from edge 21, whereas one lateral waveguide 13.2 terminates at a physical distance $(d+\Delta)$ and the other lateral waveguide 14.2 terminates at a physical distance $(d-\Delta)$ from edge 21, where illustratively $\Delta \approx 10$ $\mu$m. Reflected light from the disk is coupled back to the same waveguide. Optical power coupled back as function of the y-coordinate of the disk has maximum when plane 44 of the disk is at the focus. Since waveguides 13.2 and 14.2 are terminated at different distances from the disk, one is focussed above plane 44 of the disk and the other below it, when light from waveguide 12.2 is focussed at plane 44. Consequently, as the disk "waffles", the amount of light reflected back into waveguides 13.2 and 14.2 varies, and the optical power received by the photodetectors generates an error signal $e_f$ in the differential amplifier 18 to correct the lens position in the y-direction.

Data Output

As shown in FIG. 2, data is typically stored in an optical disk (e.g., CD-ROM or WORM disks) by modulating the reflectivity between the tracks, e.g., by holes 47 formed in the metal film 48 (e.g., Al film) in the grooves between the tracks. The presence or absence of holes defines the logic state of data inserted during a write cycle, and the modulated reflectivity modulates the intensity of the light beams which are reflected from the disk and coupled back into waveguide structure 20. To read data carried by the reflected beams, any one of the photodetector outputs, or preferably all four outputs, are coupled to output circuit 22.

Figure 4:
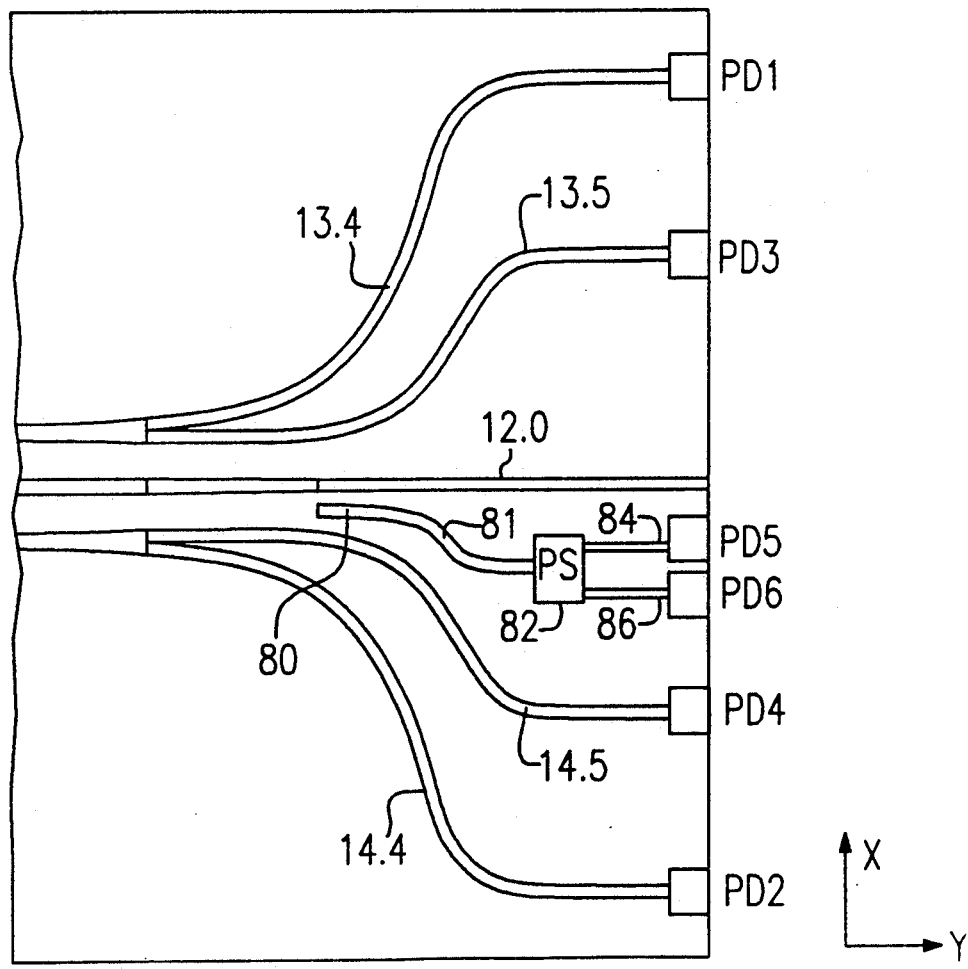
FIG. 4 is a plan view of an alternative waveguide structure for use with magneto-optic disks in accordance with another embodiment of the invention.

In the case of a magneto-optic disk, however, the logic state of data corresponds to the direction of local magnetization in a magneto-optic film which is formed on the disk (i.e., in place of metal film 48). When linearly polarized light (preferably polarized at 45° to the major plane of structure 20) is made incident on the film, the polarization of the reflected beam is rotated slightly (e.g., 0.5°–1.0°), with the direction of rotation depending on the direction (up or down) of the local magnetization. To read the output of such a disk, the TE and TM polarization in the reflected beam must be separated and then compared. This separation is accomplished, as shown in FIG. 4, by means of a polarization splitter 82 (preferably of the type described by C. H. Henry et al in U.S. Pat. No. 4,998,793). The reflected signal in one of the waveguides (e.g., 12) is coupled to splitter 82 via waveguide 81 and directional optical coupler 80. The dual output waveguides 84 and 86 of splitter 82 carry the TE and TM components, respectively, to photodetectors PD5 and PD6. Comparing the photocurrent outputs determines the logic state read.

Figure 5:
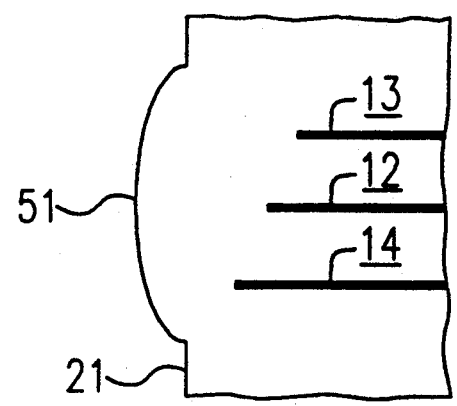
FIG. 5 is a schematic plan view of an edge of a waveguide structure having an integrated lens in accordance with yet another embodiment of the invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the aspherical lens 50 of FIG. 1 is depicted as a discrete element it may be a combination of discrete elements or it may, as shown in FIG. 5, be an integrated lens (e.g., diffraction limited, high NA) element 51 formed on the edge 21 of the waveguide structure. In the latter case, of course, position controller would be adapted to control the position of structure 20 in order to perform the tracking and/or focussing functions.

The waveguide structures (chips) described above are typically very small (e.g., 15 mm long by 3 mm wide) and extremely light weight (e.g., 0.2 g). Indeed, the entire optical head (waveguide structure, discrete lens and actuator) may weigh only about 1-2 g, making feasible access times of about 20 msec without many of the disadvantages of the prior art.

In addition, the apparatus of the invention does not require, in performing the focussing or tracking functions, that the waveguide outputs be perfectly balanced when the system is focussed or tracking properly; i.e., small imbalances can be compensated for electronically as by preamplifiers associated with each photodetector output.

Figure 6:
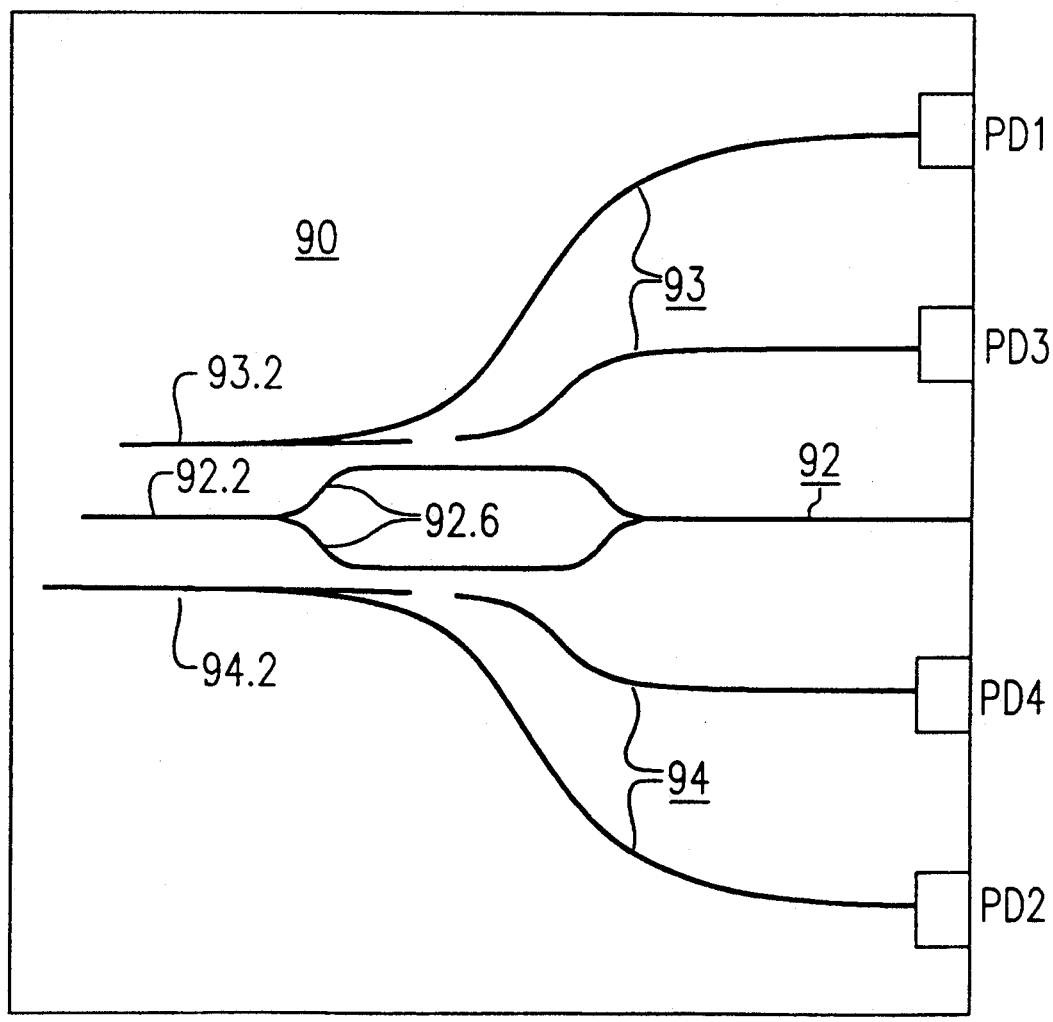
FIG. 6 is a schematic plan view of an alternative waveguide structure in accordance with still another embodiment of the invention.

Finally, the waveguide structure can be implemented in other designs. Thus, in FIG. 6 the structure 90 includes a central waveguide 92, and lateral waveguides 94 and 96 coupled to photodetectors PD1, PD3 and PD2, PD4, respectively. Illuminator/receptors are identified as 92.2, 93.2 and 94.2. Various directional couplers are apparent but unlabeled. Interference section 92.6 (a Y-branch) is included in central waveguide 92. This design may not be preferred, however, because the presence of Y-branches in central waveguide 92 may cause the beam, which has only a fundamental mode as generated by the laser, to also have unguided mode components by the time it emanates from the illuminator/receptors at the other side of the structure 90.

We claim:

1. Optical disk apparatus comprising:
   means for rotating an optical disk which has information storage sites associated with tracks thereon,
   an optical head for directing a plurality of incident light beams onto said disk, and for detecting a plurality of reflected light beams from said disk,
   feedback means responsive to said reflected beams for performing tracking and/or focussing functions, and
   data means for reading, writing and/or erasing information from said sites, characterized in that
   said optical head comprises an integrated optical waveguide structure which includes
      a first illuminator/receptor waveguide capable of supporting both fundamental and first order modes, and
      a mode interference section coupled to said first waveguide for generating optical signals representing the degree to which at least one of said incident beams is properly tracking a selected one of said tracks,
   whereby, when said apparatus is not tracking properly, said at least one beam emanating from said first illuminator/receptor waveguide is reflected back into said waveguide as both fundamental and first order modes which interfere with one another in said interference section so as to generate said optical signals representing the degree of mistracking.

2. The apparatus of claim 1 wherein said disk includes essentially concentric ridges and, when said apparatus is not tracking properly, said beam is asymmetrically positioned on a ridge associated with said selected track.

3. The apparatus of claim 1 comprising:
   a laser coupled to said first illuminator/receptor waveguide for generating said incident beams,
   said interference section comprising a Y-branch waveguide having an input arm coupled to said illuminator/receptor waveguide, and a pair of output arms in one of which said modes interfere constructively and in the other of which they interfere destructively,
   a first pair of photodetectors coupled to separate ones of said output arms and to said feedback means,
   said feedback means being responsive to the outputs of said photodetectors for generating an error signal representing the degree of mistracking and for repositioning said optical head to properly position said incident beam onto said selected track.

4. The apparatus of claims 1, 2 or 3 wherein said optical head comprises means, including a lens, for focussing said incident beams onto said disk and said feedback means includes means for controlling the position of said lens relative to said disk.

5. The apparatus of claim 4 wherein said lens is an integral part of said structure.

6. The apparatus of claim 4 wherein said integrated waveguide structure of said optical head further comprises
  second and third illuminator/receptor waveguides positioned so that the ends of said first, second and third waveguides from which said incident light beams emanate are located at different optical distances from said disk, so that when the beam from said first waveguide is properly focussed through said lens onto a plane of said disk, then the beams from said second and third waveguides are focussed through said lens to points slightly above and below said plane, respectively,
  said second and third waveguides being coupled to said feedback means,
  whereby, when the disk-to-structure distance varies, the amount of light reflected from said disk back into said second and third waveguides is unequal and an error signal is generated by said feedback means to reposition said lens relative to said disk so that the first waveguide is properly focussed onto said disk.

7. Optical disk apparatus comprising:
  means for rotating an optical disk which has information storage sites associated with tracks thereon,
  an optical head for directing a plurality of incident light beams onto said disk and for detecting a plurality of reflected light beams from said disk,
  feedback means responsive to said reflected beams for performing tracking and/or focussing functions, and
  data means for reading, writing and/or erasing information from said sites, characterized in that
  said optical head comprises an integrated optical waveguide structure which includes
    a first illuminator/receptor waveguide capable of supporting both fundamental and first order modes,
    a mode interference section coupled to said first waveguide for generating optical signals representing the degree to which at least one of said incident beams is properly tracking a selected one of said tracks, and
    waveguide means for coupling said optical signals in said first waveguide to said feedback means,
    whereby, when said apparatus is not tracking properly, said at least one beam emanating from said waveguide is reflected back into said waveguide as both fundamental and first order modes which interfere with one another in said interference section so as to generate said optical signals representing the degree of mistracking,
    second and third illuminator/receptor waveguides positioned adjacent said first illuminator/receptor waveguide so that the ends of said second and third waveguides are located at different optical distances from said disk, so that said first waveguide is focussed on a plane of said disk, said second waveguide is focussed slightly above said plane, and said third waveguide is focussed slightly below said plane,
    whereby light beams reflected from said disk enter said second and third waveguides with essentially equal power when the disk-to-structure distance corresponds to a preselected reference distance but enter said second and third waveguides with unequal power when the disk-to-structure distance deviates from said preselected distance, the difference in power between said light beams representing the degree to which said first waveguide is defocussed from said disk, and
    waveguide means for coupling said light beams in said second and third waveguides to said feedback means.

8. An optical head for reading, writing and/or erasing information from an optical disk by directing a plurality of incident light beams onto said disk, said disk having information storage sites associated with tracks thereon, characterized by an integrated optical waveguide structure comprising
  a first illuminator/receptor waveguide capable of supporting both fundamental and first order modes, and
  a mode interference section coupled to said first waveguide for generating optical signals representing the degree to which at least one of said incident beams is properly tracking a selected one of said tracks,
  whereby, when said head is not tracking properly, said at least one beam emanating from said first illuminator/receptor waveguide is reflected back into said waveguide as both fundamental and first order modes which interfere with one another in said interference section so as to generate said optical signals representing the degree of mistracking.

9. The head of claim 8 wherein said disk includes essentially concentric ridges and, when said head is not tracking properly, said beam is asymmetrically positioned on a ridge associated with said selected track.

10. The head of claim 8 wherein
  said interference section comprises a Y-branch waveguide having an input arm coupled to said illuminator/receptor waveguide and a pair of output arms in one of which said modes interfere constructively and in another of which they interfere destructively,
  said output arms being couplable to feedback means for generating an error signal representing the degree of mistracking and for repositioning said head to properly position said incident beam onto said selected track.

11. The head of claims 8 9 or 10 wherein said optical head comprises means, including a lens, for focussing said incident beam onto said disk.

12. The head of claim 11 wherein said lens is an integral part of said structure.

13. The head of claim 11 wherein said integrated waveguide structure of said optical head further comprises
  second and third illuminator/receptor waveguides positioned so that the ends of said first, second and third waveguides from which said incident light beams emanate are located at different optical distances from said disk, so that when the beam from said first waveguide is properly focussed through said lens onto a plane of said disk, then the beams from said second and third waveguides are focussed through said lens to points slightly above and below said plane, respectively,
  said second and third waveguides being coupled to feedback means,
  whereby, when the disk-to-structure distance varies, the amount of light reflected from said disk back into said second and third waveguides is unequal and an error signal is generated by said feedback means to reposition said lens relative to said disk so that the first waveguide is properly focussed onto said disk.

14. An optical head for reading, writing and/or erasing information from an optical disk by directing a plurality of incident light beams onto said disk, said disk having information storage sites associated with tracks thereon, characterized by an integrated waveguide structure comprising a first illuminator/receptor waveguide capable of supporting both fundamental and first order modes, a mode interference section coupled to said first waveguide for generating optical signals representing the degree to which at least one of said incident beams is properly tracking a selected one of said tracks, and waveguide means for coupling said optical signals in said first waveguide to feedback means, whereby, when said head is not tracking properly, said at least one beam emanating from said waveguide is reflected back into said waveguide as both fundamental and first order modes which interfere with one another in said interference section so as to generate said optical signals representing the degree of mistracking, second and third illuminator/receptor waveguides positioned adjacent said first illuminator/receptor waveguide so that the ends of said second and third waveguides are located at different optical distances from said disk, so that said first waveguide is focussed on a plane of said disk, said second waveguide is focussed slightly above said plane, and said third waveguide is focussed slightly below said plane, whereby light beams reflected from said disk enter said second and third waveguides with essentially equal power when the disk-to-structure distance corresponds to a preselected reference distance but enter said second and third waveguides with unequal power when the disk-to-structure distance deviates from said preselected distance, the difference in power between said light beams representing the degree to which said first waveguide is defocussed from said disk, and waveguide means for coupling said light beams in said second and third waveguides to feedback means.

* * * * *